United States Patent [19]
Tönniges

[11] Patent Number: 4,525,321
[45] Date of Patent: Jun. 25, 1985

[54] PROCESS FOR PREPARING FLAT ARTICLES BASED ON DEFIBRATED COMPONENTS OF WOOD

[75] Inventor: Heinz Tönniges, Krefeld, Fed. Rep. of Germany

[73] Assignee: Deutsche Fibrit Gesellschaft Ebers & Dr. Müller mbH, Krefeld, Fed. Rep. of Germany

[21] Appl. No.: 472,788

[22] Filed: Mar. 7, 1983

[30] Foreign Application Priority Data

Mar. 12, 1982 [DE] Fed. Rep. of Germany ....... 3208963

[51] Int. Cl.[3] .................. B29J 5/00
[52] U.S. Cl. .................. 264/517; 264/121
[58] Field of Search .............. 264/109, 112, 113, 121, 264/517, 108, 258

[56] References Cited

U.S. PATENT DOCUMENTS 4,257,995 3/1981 McLaughlin et al. .............. 264/122
4,375,448 3/1983 Appel et al. ........................ 264/121

OTHER PUBLICATIONS

Particleboard, A. A. Moslemi, Southern Illinois University Press, 1974, p. 39.

*Primary Examiner*—Donald Czaja
*Assistant Examiner*—V. Fischbach
*Attorney, Agent, or Firm*—Sprung Horn Kramer & Woods

[57] ABSTRACT

The invention relates to a process for preparing flat articles which are moulded in any desired shaped in dry moulds from defibrated components of wood. In this process, the moisture required to give good felting remains a constituent of the wood fibres until the moulding stage. These wood fibres are mixed with fibre- and/or moisture-reactive binders and, if appropriate, auxiliaries, are metered by means of a gravity-compensating air stream onto a preform sieve, and are then compression-moulded without a cooling cycle in sieve-free moulds between two surfaces which are smooth or embossed in any desired pattern.

17 Claims, No Drawings

PROCESS FOR PREPARING FLAT ARTICLES BASED ON DEFIBRATED COMPONENTS OF WOOD

BACKGROUND OF THE INVENTION

The invention relates to a process for preparing wood-fibre materials in a particularly economical manner and where the end product is given a previously not achieved range of properties.

The present demand for flat moulded articles, boards, webs and the like is satisfied with various suitable materials, and combinations thereof, which are prepared and processed by many and varied techniques.

Essential sources of raw material for such materials are homegrown, renewable types of wood which are treated and processed to meet the demands placed on the finished product and with an eye on their particular, specific properties. Demands which these materials have to meet are of course primarily the result of the need for economical manufacture and, in some cases, for a long life given sensible use of the parts.

The catalogue of criteria for determining fitness for use is complex, and includes, inter alia, requirements such as universal shapeability, fire resistance, thermal and water stability at a suitable level of water absorption, freeze-thaw cycle stability, resistance to root penetration, acoustic and thermal insulating properties, low density, high flexural tensile strength and rigidity, high compressive strength and strength transverse to the grain, laminatability and/or paintability, gas permeability, uniform surface appearance, pleasant feel and sound, physiological acceptability, force-induction capability and screw-holding power, reliable reproducibility, long-term availability of the raw materials, and so on and so on.

It has been found that if the known methods of preparing flat moulded articles based on, for example, wood materials satisfy one requirement of their properties, they are unable to satisfy an examination in respect of the other requirements. For this reason those skilled in the art have for a long time had to accept compromise solutions which were the result of apparently diametrically opposed requirements, or the overall level of the properties had to be raised, by an economically not always justified high degree of refinement of the products, in order, then, to satisfy a few demands fully.

The existing wet-moulding processes combine very low binder contents with fibre structures which are on the one hand well-felted, hence having substantial strength while there is considerable freedom in designing the shape, but which, on the other hand, require energy-intensive squeezing, drying and compression-moulding steps, which are expensive. Moreover, the finished products are always marked on one face by the pattern of the drying sieve.

The existing dry methods, at comparable binder contents and without incorporating relatively expensive auxiliary materials and carriers, give inadequate fibre structures, so that obtaining good moulding results always necessitates resin-rich batches. Also required are modifying additives, preliminary and/or intermediate and/or after-treatments, such as cutting the mat to size, moisture or steam opening treatments, impregnating, dwell times for cooling and/or relaxing, and the like.

It follows from this need that it is an object of the present invention to prepare as economically as possible flat fibrous moulded articles which satisfy a very broad spectrum of different technical requirements.

SUMMARY OF THE INVENTION

To attain the above object the present invention provides a process for preparing articles which have been compression-moulded under dry conditions into any desired shape where the walls are thin relative to their area and which are based on defibrated wood fibres to which fibre- and/or moisture-reactive binders and, if appropriate, auxiliaries have been added and which have a moisture content of 1 to 30% by weight relative to all components of an article, characterised in that a metered amount of the moulding material is brought into contact, in a gravity-compensating air stream, with a preform sieve where it is made to adhere by means of a vacuum applied from the side of the sieve facing away from the moulding surface of the sieve, and the preform is then compression-moulded, in sieve-free moulds, without a cooling cycle, between two surfaces which are smooth or embossed with any desired pattern.

It has been found that, on being conveyed in an airstream at room temperature and of customary relative humidity, wet-defibrated coarse wood chips of German origin retain sufficient moisture to remain sufficiently flexible in the opened-up state to give optimal felting in a sieve-moulding process from the airstream. In the case of a preform obtained from the airstream by retention on a sieve, this moisture content does not interfere as customary with the compression-moulding if the same phase contains materials at least some of which react with the water under the compression-moulding conditions and bind excess amounts thereof.

It has also been found that these materials can act as binders and that they can be added on the route from the defibrating to the preforming, and also that the additives can have a favourable effect on the texture of preforms, and that more markedly contoured preforms can be prepared when the preform direction is not subject to gravity.

Fibrous materials thus prepared remain compatible, in the presence of auxiliaries known in the wood pulp and paper industry in the widest sense, through to the compression-moulding stage, and to them can be added reinforcing and/or diluting and/or other fillers, such as flame-retardants, pigments, waste materials and the like. They can be compression-moulded without drying sieves or the like, at low temperatures and without a cooling cycle.

The essence of the invention consists in the preparation of flat articles prepared from a fibrous material in an economical manner by means of processes which combine the advantages of known wet processes with those of known dry processes in such a way that the product remains free of the respective known disadvantages, and where the raw material base is readily accessible, can be regenerated, and will remain available in the long term.

A suitable choice of process and materials enables articles to be moulded in an economical manner from fibrous material which can be given any desired shape, are mechanically very stable, can be painted and laminated, have adequate wet strength, have a pleasant feel and sound, and combine good mechanical strength with a maximum of economy in respect of raw materials, the processes and the stress on the moulds.

Generally applicable requirements, such as those relating to safety and environmental needs, are met by these flat moulded articles not only in automotive and aircraft construction and ship-building but also, only as an example, in furniture-making and interior decoration whenever the properties combined according to the invention are of advantage.

The advantages of the process according to the invention can be summarized as follows:

economical manufacture due to low binder content and energy requirements and avoidance of preliminary and subsequent work freedom in the design of the shape low density combined with high mechanical values embossing on two sides in any pattern and uniform surfaces pleasant feel and sound.

It is possible to use defibrated hardwoods and/or softwoods which are mechanically fiberised and/or those which have been chemically opened up and/or those which have been additionally ground and/or those whose tissue has been softened by pressure and/or heat, in admixture, alone and/or together with foreign fibres which can be cellulose-containing and/or cellulose-free, synthetic and/or natural.

The absolutely dry content before transfer into an air stream should be within a range from 98 to 40%, preferably 85 to 55%, and on removal from the airstream 98 to 70% preferably 90 to 75%.

According to the invention, the fibre material is mixed in the airstream and/or suitable mixing elements with binders, such as aliphatic, cycloaliphatic, aromatic, araliphatic and/or heterocyclic isocyanates having at least two isocyano groups, which are known, for example, from "Annalen der Chemie", Volume 562, pages 75 to 136. According to the invention, modifications are carried out by means of emulsifiers, accelerators, inhibitors or the like side by side with additions of other auxiliaries.

According to the invention, further additives are those materials which likewise bind water irreversibly, such as, for example, reactive aluminosilicic acid (silicate-forming matter), pozzolans (hydraulic additives) in lime, pozzolan, hydrated mortar pozzolans such as, for example, diatomaceous earth, moler, Si material and Si trass, anhydrous pozzolans together with calcium hydroxide and commercially available pozzolan limes, hydraulic limes, Roman cements, air-dried clays, tricalcium silicate, dicalcium aluminate ferrite and latent hydraulic materials, and also pozzolan cement, high-alumina cement, and also other water-settable materials such as gypsums and anhydrite and the like, which may be rounded off by other known modifying additives.

The fibre formulation, after or before combination with all additives, is whirled from an airstream onto a contoured sieve surface, which is not loaded from above to avoid trickle and/or sprinkle effects overloading the surface in concave and underloading it in convex areas.

According to the invention, the back of the moulding sieve is permanently or intermittently subject to a vacuum which, on its own or reinforced by mechanical measures and assisted by the air conveying the fibre material, ensures temporary cohesion of the preform and desirable predensification and prefelting.

The fibre formulation is metered by weight and/or volume as a function of the size of the mould and/or the desired wall thickness and/or the desired density and/or the formal degree of difficulty and the like, per working cycle of the preform sieve, and after each quantitative distribution of the fibrous substance over the sieve, the fibrous substance may be further predensified by suitable measures and is then passed on to the mould.

The moulding takes places under economically advantageous conditions, at low temperatures and/or for short periods, without a cooling cycle in sealed or largely sealed moulds without drying sieve or the like, whereby it is possible to emboss the two part-surfaces with desirable textures.

Flat moulded articles based on regeneratable raw materials in dry moulds can be prepared as follows:

The softwood and/or hardwood pulp prepared in an Asplund defibrator is stored for a period for transport and/or ageing and/or cooling, and freed, by known methods, of 5–80%, preferably 40–65%, of its moisture, so that free flow is obtained and the individual fibres are prevented from hardening, which, as is known, happens with increasing absolutely dry content.

The bulk material thus prepared passes on to, for example, a chip and resin mixer or another piece of equipment suitable for loosening up and/or transporting the material and/or applying glue to it and is mixed with auxiliaries and additives such as, for example, 0.01–10% by weight, preferably 0.1–5% by weight, of water repellent, 0.01–10% by weight, preferably 0.05–5% by weight, of dyestuffs and/or coloured pigments, 0.001–2.0% by weight, preferably 0.005–1.0% by weight, of reaction accelerator, 0.01–40% by weight, preferably 1.0–30% by weight, of flame-retardant, and/or 0.001–10% by weight, preferably 0.01–2.0% by weight, of mould release agent and/or lubricant, in principle any desired amounts, but preferably up to the amount of the wood pulp (absolutely dry content) used, of inorganic and/or organic fillers and/or waste and/or reinforcing materials and 0.3–18% by weight, preferably 0.5–11.5% by weight, of a commercially available polyurethane curing agent, such as modified 4,4-diphenylmethane diisocyanate (MDI), and/or one of its prepolymers.

On passing through a piece of equipment having the action described above the loosened, modified wood pulp passes into a gas stream and is blown from below in an accurately metered amount onto a moulding sieve which has approximately the same contours as the flat moulded article is finally to have been given in the method, and the air stream is assisted, at least intermittently, by a zone of vacuum on the side facing away from the moulding surface.

This gives a preform which, depending on the metering, has thicknesses of about 1.0 mm to about 350 mm with densities of about 10 kg/m$^3$ to about 150 kg/m$^3$, and which on removal of the air stream remains attached in the moulding sieve and can be laid from there onto the lower face of a mould which has been heated to 40° C.–290° C., preferably 110° C. to 190° C. The flat moulded article can be compression-moulded within 3 to 900 seconds, in particular within 20 to 375 seconds, under specific pressures of 1 to 130 bar, in particular 4 to 40 bar, and be removed, without cooling down, from the mould.

I claim:

1. In a process for manufacturing a three-dimensional article by compression-moulding under dry conditions into any desired shape where the walls are thin relative their area and which are based on defibrated wood fibres to which binders have been added and which have a moisture content of 1 to 30% by weight relative to all components of an article, the improvement wherein a proportioned amount of the moulding material disposed in an air stream is brought in contact with the bottom side of a preform sieve and a vacuum is applied from above said sieve whereby to form a fibre containing preform, and the thus preformed product is then compression-moulded into the desired final shape of the article.

2. Process according to claim 1, wherein in that a material containing a reactive polyfunctional isocyanate is admixed as binder.

3. Process according to claim 1, wherein in that the moisture content of the wood fibres is set to such a value that on removal from the airstream it is 10 to 24% relative to all components of an article.

4. Product manufactured by the process according to claim 1.

5. A process according to claim 1, wherein said surfaces are smooth.

6. A process according to claim 1, wherein at least one of said surfaces is embossed with a desired pattern.

7. A process according to claim 1 wherein the moulding composition contains an agent selected from the group consisting of flame-retarding agents, water repellents, lubricants, antistats, colorants, mould-release agents, blowing agents, corrosion inhibitors, pourability-preserving agents, reinforcing agents, active fillers and inert fillers.

8. A process according to claim 1 wherein the preform product is compression-moulded between two surfaces.

9. A process according to claim 8 wherein the preform product is compression-moulded in a sieve-free mould.

10. A process according to claim 1 wherein said sieve is contoured.

11. A process according to claim 10 wherein said sieve has a convex contour.

12. A process according to claim 10 wherein said sieve has a concave contour.

13. A process according to claim 10 wherein said moulding material is deposited onto said preform sieve to form a preform whose thickness is 1.0 mm to about 350 mm.

14. A process according to claim 10 wherein said moulding material is disposed on said preform sieve so as to form a preform whose density is 10 $kg/m^3$ to about 150 $kg/m^3$.

15. A process according to claim 11 wherein said moulding material is disposed on said preform sieve so as to form a preform whose density is 10 $kg/m^3$ to about 150 $kg/m^3$.

16. A process according to claim 12 wherein said moulding material is disposed on said preform sieve so as to form a preform whose density is 10 $kg/m^3$ to about 150 $kg/m^3$.

17. A process according to claim 10 wherein said moulding material consists essentially of said fibres, up to 10% by weight water repellant, up to 10% by weight of dyestuff or colored pigment, up to 2% by weight of a reaction accelerator, up to 40% by weight of a fire-retardant, up to 10% by weight of a mould-release agent or lubricant and up to 18% by weight of a polyurethane curing agent.

* * * * *

UNITED STATES PATENT AND TRADEMARK OFFICE

CERTIFICATE OF CORRECTION

PATENT NO. : 4,525,321

DATED : June 25, 1985

INVENTOR(S) : Heinz Tönniges

It is certified that error appears in the above-identified patent and that said Letters Patent is hereby corrected as shown below:

Col. 5, lines 10 and 13 Delete "in that"

Signed and Sealed this

*Twenty-second* Day of *October 1985*

[SEAL]

*Attest:*

DONALD J. QUIGG

*Attesting Officer*

*Commissioner of Patents and Trademarks—Designate*